United States Patent

Hamura et al.

Patent Number: 5,906,955
Date of Patent: May 25, 1999

[54] CATALYST FOR POLYMERIZATION OF AN OLEFIN, AND METHOD FOR PRODUCING AN OLEFIN POLYMER

[75] Inventors: Satoshi Hamura, Yokkaichi; Hisami Yasuda, Mie-gun; Toru Yoshida; Morihiko Sato, both of Yokkaichi, all of Japan

[73] Assignee: Tosoh Corporation, Yamaguchi-ken, Japan

[21] Appl. No.: 08/991,210

[22] Filed: Dec. 16, 1997

[30] Foreign Application Priority Data

Dec. 20, 1996 [JP] Japan .................................. 8-341848

[51] Int. Cl.⁶ ............................. B01J 31/00; C07F 17/00; C08F 4/02
[52] U.S. Cl. ......................... 502/103; 502/117; 526/129; 526/160; 526/943; 556/11; 556/43; 556/53; 556/54
[58] Field of Search ..................... 502/103, 117; 556/11, 53, 54, 43; 526/943, 160, 129

[56] References Cited

FOREIGN PATENT DOCUMENTS

| | | |
|---|---|---|
| 786 466 | 7/1977 | European Pat. Off. . |
| 658 576 | 6/1995 | European Pat. Off. . |
| 9 059310 | 7/1997 | Japan . |

*Primary Examiner*—Porfirio Nazario-Gonzalez
*Attorney, Agent, or Firm*—Sughrue, Mion, Zinn, Macpeak & Seas, PLLC

[57] ABSTRACT

A catalyst for polymerization of an olefin, which comprises (a) a transition metal compound of the following formula (1), (2) and/or (3):

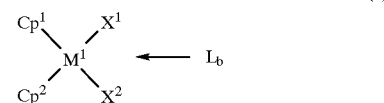

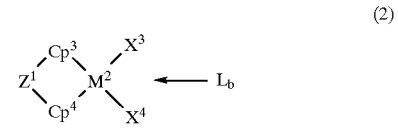

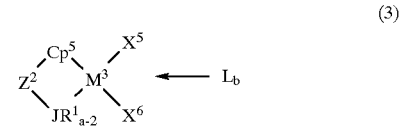

wherein each of $M^1$, $M^2$ and $M^3$ is a titanium atom, a zirconium atom or a hafnium atom, each of $Cp^1$, $Cp^2$, $Cp^3$, $Cp^4$ and $Cp^5$ is a cyclopentadienyl group, an indenyl group, a fluorenyl group or a substitution product thereof, $R^1$ is a hydrogen atom, a $C_{1-20}$ hydrocarbon group or a $C_{1-20}$ alkylsilyl group, each of $X^1$, $X^2$, $X^3$, $X^4$, $X^5$ and $X^6$ is a hydrogen atom or a $C_{1-20}$ hydrocarbon group, $Z^1$ is a $C_{1-20}$ hydrocarbon group, a silicon-containing $C_{1-20}$ hydrocarbon group or a $C_{1-20}$ alkylsilanediyl group, which serves to connect $Cp^3$ and $Cp^4$, $Z^2$ is a $C_{1-20}$ hydrocarbon group, a silicon-containing $C_{1-20}$ hydrocarbon group or a $C_{1-20}$ alkylsilanediyl group, which serves to connect $Cp^5$ and J, J is an element of Group 15 or 16 of the Periodic Table, a is a coordination number of J, L is a Lewis base, and b is the number of the Lewis base L, provided $0 \leq b \leq 3$, and (b) a modified clay obtained by treating clay or clay mineral with a compound containing an element of Group 15 or 16 of the Periodic Table.

3 Claims, No Drawings

CATALYST FOR POLYMERIZATION OF AN OLEFIN, AND METHOD FOR PRODUCING AN OLEFIN POLYMER

The present invention relates to a catalyst for polymerization of an olefin comprising a certain specific transition metal compound and a certain specific modified clay, and a method for producing an olefin polymer employing this catalyst.

As a method for producing a polyolefin by polymerization of an olefin, a catalyst system is well known which is a combination of a transition metal compound and an organic aluminum compound. For example, Kaminsky et al disclose in e.g. JP-A-58-19309 that a catalyst employing metallocene and methyl aluminoxane exhibits a high activity for the production of an olefin polymer containing propylene.

The catalyst system disclosed therein is excellent in the polymerization activity, but the catalyst system is soluble in the reaction system, and a solution polymerization system is employed in many cases, whereby not only the production process is limited, but also it is required to use relatively expensive methyl aluminoxane in a large amount in order to produce a polymer having industrially useful physical properties, whereby there has been a problem of the cost of the catalyst or a problem that a large amount of the aluminum compound remains in the formed polymer.

Therefore, a new co-catalyst has recently been studied wherein no organic aluminum oxy compound such as methyl aluminoxane is used. For example, JP-A-1-501950 and JP-A-1-502036 disclose that special boron compounds are effective as co-catalysts. However, such boron compounds have a very complicated structure, and have not yet solved the problem of the cost.

Further, JP-A-5-301917 and JP-A-7-309907 disclose catalyst systems comprising inexpensive clay or clay treated with inorganic salts, as a constituting component. Further, JP-A-7-224106 discloses a catalyst system employing an interlaminar cation-modified clay obtained by reacting clay and an organic cation utilizing the surface negative charge of clay mineral. However, these catalyst systems also contain organic aluminum compounds as constituting components of the catalysts, whereby there has been a problem that substantial catalyst residues such as aluminum compounds tend to remain in the formed polymers.

The present invention has been made to solve the above problems, and it is an object of the present invention to provide a catalyst for polymerization of an olefin, which is inexpensive and of high activity and which is capable of synthesizing a polymer containing little catalyst residues, and to provide a method for producing an olefin polymer employing it.

The present inventors have conducted an extensive study to solve the above problems and as a result, have found it possible to synthesize a polymer containing little catalyst residues, by employing a catalyst for polymerization of an olefin, which comprises a certain specific transition metal compound and a certain specific modified clay obtained by treating clay or clay mineral with a compound containing an element of Group 15 or 16 of the Periodic Table. The present invention has been accomplished on the basis of this discovery.

Namely, the present invention provides a catalyst for polymerization of an olefin, which comprises (a) a transition metal compound of the following formula (1), (2) and/or (3):

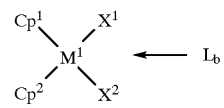  (1)

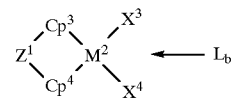  (2)

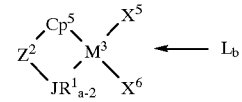  (3)

wherein each of $M^1$, $M^2$ and $M^3$ is a titanium atom, a zirconium atom or a hafnium atom, each of $Cp^1$, $Cp^2$, $Cp^3$, $Cp^4$ and $Cp^5$ is a cyclopentadienyl group, an indenyl group, a fluorenyl group or a substitution product thereof, $R^1$ is a hydrogen atom, a $C_{1-20}$ hydrocarbon group or a $C_{1-20}$ alkylsilyl group, each of $X^1$, $X^2$, $X^3$, $X^4$, $X^5$ and $X^6$ is a hydrogen atom or a $C_{1-20}$ hydrocarbon group, $Z^1$ is a $C_{1-20}$ hydrocarbon group, a silicon-containing $C_{1-20}$ hydrocarbon group or a $C_{1-20}$ alkylsilanediyl group, which serves to connect $Cp^3$ and $Cp^4$, $Z^2$ is a $C_{1-20}$ hydrocarbon group, a silicon-containing $C_{1-20}$ hydrocarbon group or a $C_{1-20}$ alkylsilanediyl group, which serves to connect $Cp^5$ and J, J is an element of Group 15 or 16 of the Periodic Table, a is a coordination number of J, L is a Lewis base, and b is the number of the Lewis base L, provided $0 \leq b \leq 3$, and (b) a modified clay obtained by treating clay or clay mineral with a compound containing an element of Group 15 or 16 of the Periodic Table.

The present invention also provides a method for producing an olefin polymer, which comprises polymerizing or copolymerizing an olefin in the presence of the catalyst for polymerization of an olefin as defined above.

Now, the present invention will be described in detail with reference to the preferred embodiments.

The transition metal compound which is a constituting component of the catalyst for polymerization of an olefin of the present invention, has a structure of the formula (1), (2) or (3).

In the formulae (1), (2) and (3), each of $M^1$, $M^2$ and $M^3$ is a transition metal atom of Group 4 of the Periodic Table selected from a titanium atom, a zirconium atom and a hafnium atom.

Each of $Cp^1$ and $Cp^2$ is a cyclopentadienyl group an indenyl group, a fluorenyl group or a substitution product thereof, of the following formula (4), (5), (6) or (7), bonded to the transition metal $M^1$:

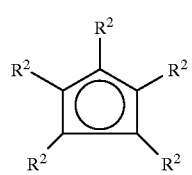  (4)

-continued

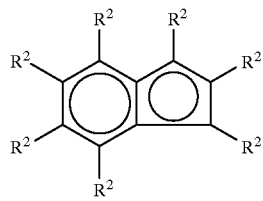

(5)

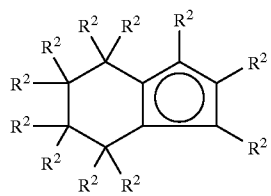

(6)

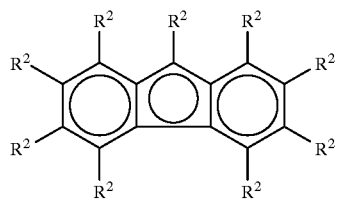

(7)

wherein each of the plurality of $R^2$ which are independent of one another, is a hydrogen atom, a $C_{1-20}$ alkyl group, a $C_{6-20}$ aryl, arylalkyl or alkylaryl group, a $C_{1-20}$ alkylsilyl group, a $C_{1-20}$ hydrocarbon group containing an oxygen atom, a nitrogen atom, a phosphorus atom, a sulfur atom or a silicon atom, or an amino, alkoxy or aryloxy group having a $C_{1-20}$ hydrocarbon group bonded thereto. Specific examples for $Cp^1$ or $Cp^2$ include a cyclopentadienyl group, an indenyl group, a fluorenyl group, and their substitution products with an alkyl group such as a methyl group, an ethyl group, an isopropyl group, a n-butyl group or a t-butyl group, their substitution products with an aryl group such as a phenyl group or a mesityl group, their substitution products with an arylalkyl group such as a benzyl group, their substitution products with a silyl group such as a trimethylsilyl group, a dimethylphenylsilyl group, a methylphenylsilyl group or a triphenylsilyl group, their substitution products with an alkoxy group such as a methoxy group, an ethoxy group or an isopropoxy group, their substitution products with an aryloxy group such as a phenoxy group, and their substitution products with an amino group such as a dimethylamino group, a diethylamino group, a diisopropylamino group, a diphenylamino group or a dibenzylamino group. Preferred are, for example, a cyclopentadienyl group, a methylcyclopentadienyl group, a dimethylcyclopentadienyl group, a pentamethylcyclopentadienyl group, a phenylcyclopentadienyl group, a trimethylsilylcyclopentadienyl group, a di(trimethylsilyl)cyclopentadienyl group, a dimethylaminocyclopentadienyl group, an indenyl group, a 2-methylindenyl group, a 2-methyl-4-isobutylindenyl group, a 2-methyl-4-phenylindenyl group, a 2-methyl-4-(1-naphthyl)indenyl group, a tetrahydroindenyl group, a fluorenyl group, a 2,7-dimethylfluorenyl group, a 2,7-di(t-butyl) fluorenyl group, a 2,7-di(dimethylamino)fluorenyl group, a 2,7-di(diethylamino)fluorenyl group, a 2,7-di(di(t-butyl) amino)fluorenyl group, a 2,7-dimethoxyfluorenyl group, a 2,7-di(trimethylsilyl)fluorenyl group, and an octahydrofluorenyl group.

Each of $Cp^3$, $Cp^4$ and $Cp^5$ is a cyclopentadienyl group, an indenyl group, a fluorenyl group or a substitution product thereof, of the following formula (8), (9), (10) or (11), bonded to the transition metal $M^2$ or $M^3$:

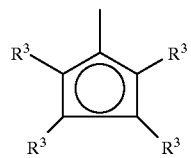

(8)

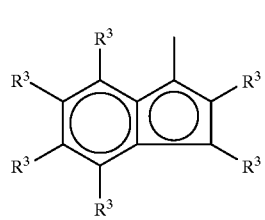

(9)

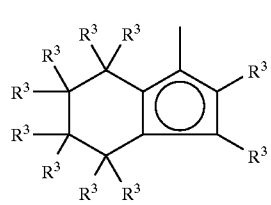

(10)

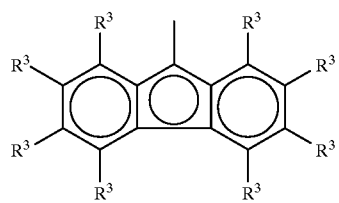

(11)

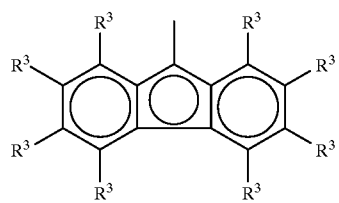

wherein each of the plurality of $R^3$ which are independent of one another, is a hydrogen atom, a $C_{1-20}$ alkyl group, a $C_{6-20}$ aryl, arylalkyl or alkylaryl group, a $C_{1-20}$ alkylsilyl group, a $C_{1-20}$ hydrocarbon group containing an oxygen atom, a nitrogen atom, a phosphorus atom, a sulfur atom, a silicon atom or a halogen atom, or an amino, alkoxy or aryloxy group having a $C_{1-20}$ hydrocarbon group bonded thereto. Specific examples for $Cp^3$, $Cp^4$ or $Cp^5$ include a cyclopentadienyl group, an indenyl group, a fluorenyl group, and their substitution products with an alkyl group such as a methyl group, an ethyl group, an isopropyl group, a n-butyl group or a t-butyl group, their substitution products with an aryl group such as a phenyl group or a mesityl group, their substitution products with an arylalkyl group such as a benzyl group, their substitution products with a silyl group such as a trimethylsilyl group, a dimethylphenylsilyl group, a methylphenylsilyl group or a triphenylsilyl group, their substitution products with an alkoxy group such as a methoxy group, an ethoxy group or an isopropoxy group, their substitution products with an aryloxy group such as a phenoxy group, and their substitution products with an amino group such as a dimethylamino group, a diethylamino group, a diisopropylamino group, a diphenylamino group or a dibenzylamino group. Preferred are, for example, a cyclopentadienyl group, a methylcyclopentadienyl group, a dimethylcyclopentadienyl group, a phenylcyclopentadienyl group, a trimethylsilylcyclopentadienyl group, a di(trimethylsilyl)cyclopentadienyl group, a dimethylaminocyclopentadienyl group, an indenyl group, a 2-methylindenyl group, a 2-methyl-4-isobutylindenyl group, a 2-methyl-4-phenylindenyl group, a 2-methyl-4-(1-naphthyl)indenyl group, a tetrahydroindenyl group, a fluorenyl group, a 2,7-dimethylfluorenyl group, a 2,7-di(t-butyl) fluorenyl group, a 2,7-di(dimethylamino)fluorenyl group, a 2,7-di(diethylamino)fluorenyl group, a 2,7-di(di(t-butyl) amino)fluorenyl group, a 2,7-dimethoxyfluorenyl group, a 2,7-di(trimethylsilyl)fluorenyl group, and an octahydrofluorenyl group.

$R^1$ is a hydrogen atom, a $C_{1-20}$ hydrocarbon group or an alkylsilyl group. Specifically, it may, for example, be a methyl group, an ethyl group, an isopropyl group, a n-butyl group, a t-butyl group, a phenyl group, a cyclohexyl group, a cyclododecyl group or a trimethylsilyl group.

Each of $X^1$, $X^2$, $X^3$, $X^4$, $X^5$ and $X^6$ is a hydrogen atom or a $C_{1-20}$ hydrocarbon group. Specifically, it may, for example, be a methyl group, an ethyl group, a propyl group, an isopropyl group, a n-butyl group, an isobutyl group, a t-butyl group, a benzyl group or a phenyl group.

$Z^1$ is a $C_{1-20}$ hydrocarbon group, a silicon-containing $C_{1-20}$ hydrocarbon group or a $C_{1-20}$ alkylsilanediyl group, and it has a structure of the following formula (12):

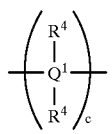

(12)

wherein $Q^1$ is a carbon atom, a silicon atom or an oxygen atom, each of two $R^4$ which are independent of each other, is a hydrogen atom, a $C_{1-19}$ hydrocarbon group such as a methyl group, an ethyl group, a propyl group, an isopropyl group, a butyl group, a t-butyl group, a phenyl group or a benzyl group, a $C_{1-19}$ alkoxy group such as a methoxy group, or a $C_{1-19}$ alkylsilyl group such as a trimethylsilyl group or a dimethylphenylsilyl group, and c is an integer of from 1 to 10, and it serves to connect $Cp^3$ and $Cp^4$. Specifically, $Z^1$ may, for example, be an alkylene such as methylene, dimethylmethylene, phenylmethylmethylene, diphenylmethylene, ethylene or propylene, or an alkylsilanediyl group such as dimethylsilanediyl, methylphenylsilanediyl or diphenylsilanediyl.

$Z^2$ is a $C_{1-20}$ hydrocarbon group, a silicon-containing $C_{1-20}$ hydrocarbon group or a $C_{1-20}$ alkylsilanediyl group, and it has a structure of the following formula (13):

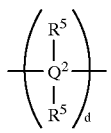

(13)

wherein $Q^2$ is a carbon atom, a silicon atom or an oxygen atom, each of two $R^5$ which are independent of each other, is a hydrogen atom, a $C_{1-19}$ hydrocarbon group such as a methyl group, an ethyl group, a propyl group, an isopropyl group, a butyl group, a t-butyl group, a phenyl group or a benzyl group, a $C_{1-19}$ alkoxy group such as a methoxy group, or a $C_{1-19}$ alkylsilyl group such as a trimethylsilyl group or a dimethylphenylsilyl group, and d is an integer of from 1 to 10, and it serves to connect $Cp^5$ and J. Specifically, $Z^2$ may, for example, be an alkylene such as methylene, dimethylmethylene, phenylmethylmethylene, diphenylmethylene, ethylene or propylene, or an alkylsilanediyl group such as dimethylsilanediyl, methylphenylsilanediyl or diphenylsilanediyl.

J is an element of Group 15 or 16 bonded to the transition metal $M^3$. Specifically, it may be a nitrogen atom, a phosphorus atom, an oxygen atom or a sulfur atom. a is a coordination number of J. When J is an element of Group 15, a is 3, and when J is an element of Group 16, a is 2. L is a Lewis base coordinated to the transition metal $M^1$, $M^2$ or $M^3$. Specifically, it may, for example, be diethyl ether, tetrahydrofuran, dimethoxyethane, trimethylphosphine, dimethylphenylphosphine, methyldiphenylphosphine or triphenylphosphine. b is the number of the Lewis base L, provided $0 \leq b \leq 3$.

The compound of the formula (1), (2) and/or (3) includes, for example, bis(cyclopentadienyl)titaniumdimethyl, bis(cyclopentadienyl)zirconiumdimethyl, bis(cyclopentadienyl)hafniumdimethyl, bis(methylcyclopentadienyl)titaniumdimethyl, bis(methylcyclopentadienyl)zirconiumdimethyl, bis(methylcyclopentadienyl)hafniumdimethyl, bis(butylcyclopentadienyl)titaniumdimethyl, bis(butylcyclopentadienyl)zirconiumdimethyl, bis(butylcyclopentadienyl)hafniumdimethyl, bis(pentamethylcyclopentadienyl)titaniumdimethyl, bis(pentamethylcyclopentadienyl)zirconiumdimethyl, bis(pentamethylcyclopentadienyl)hafniumdimethyl, bis(indenyl)titaniumdimethyl, bis(indenyl)zirconiumdimethyl, bis(indenyl)hafniumdimethyl, methylenebis(cyclopentadienyl)titaniumdimethyl, methylenebis(cyclopentadienyl)zirconiumdimethyl, methylenebis(cyclopentadienyl)hafniumdimethyl, methylenebis(methylcyclopentadienyl)titaniumdimethyl, methylenebis(methylcyclopentadienyl)zirconiumdimethyl, methylenebis(methylcyclopentadienyl)hafniumdimethyl, methylenebis(butylcyclopentadienyl)titaniumdimethyl, methylenebis(butylcyclopentadienyl)zirconiumdimethyl, methylenebis(butylcyclopentadienyl)hafniumdimethyl, methylenebis(tetramethylcyclopentadienyl) titaniumdimethyl, methylenebis(tetramethylcyclopentadienyl) zirconiumdimethyl, methylenebis(tetramethylcyclopentadienyl)hafniumdimethyl, ethylenebis(indenyl)titaniumdimethyl, ethylenebis(indenyl)zirconiumdimethyl, ethylenebis(indenyl)hafniumdimethyl, ethylenebis(tetrahydroindenyl)titaniumdimethyl, ethylenebis(tetrahydroindenyl)zirconiumdimethyl, ethylenebis(tetrahydroindenyl)hafniumdimethyl, ethylenebis(2-methyl-1-indenyl)titaniumdimethyl, ethylenebis(2-methyl-1-indenyl)zirconiumdimethyl, ethylenebis(2-methyl-1-indenyl)hafniumdimethyl, isopropylidene(cyclopentadienyl-9-fluorenyl) titaniumdimethyl, isopropylidene(cyclopentadienyl-9-fluorenyl)zirconiumdimethyl, isopropylidene (cyclopentadienyl-9-fluorenyl)hafniumdimethyl, isopropylidene(cyclopentadienyl-2,7-dimethyl-9-fluorenyl) titaniumdimethyl, isopropylidene(cyclopentadienyl-2,7-dimethyl-9-fluorenyl)zirconiumdimethyl, isopropylidene (cyclopentadienyl-2,7-dimethyl-9-fluorenyl) hafniumdimethyl, isopropylidene(cyclopentadienyl-2,7-di-t-butyl-9-fluorenyl)titaniumdimethyl, isopropylidene (cyclopentadienyl-2,7-di-t-butyl-9-fluorenyl) zirconiumdimethyl, isopropylidene(cyclopentadienyl-2,7-di-t-butyl-9-fluorenyl)hafniumdimethyl, diphenylmethylene (cyclopentadienyl-9-fluorenyl)titaniumdimethyl, diphenylmethylene(cyclopentadienyl-9-fluorenyl) zirconiumdimethyl, diphenylmethylene(cyclopentadienyl-9-fluorenyl)hafniumdimethyl, diphenylmethylene (cyclopentadienyl-2,7-dimethyl- 9-fluorenyl) titaniumdimethyl, diphenylmethylene(cyclopentadienyl-2,7-dimethyl-9-fluorenyl)zirconiumdimethyl, diphenylmethylene(cyclopentadienyl-2,7-dimethyl-9-fluorenyl)hafniumdimethyl, diphenylmethylene (cyclopentadienyl-2,7-di-t-butyl-9-fluorenyl) titaniumdimethyl, diphenylmethylene(cyclopentadienyl-2,7-di-t-butyl-9-fluorenyl)zirconiumdimethyl, diphenylmethylene(cyclopentadienyl-2,7-di-t-butyl-9-fluorenyl)hafniumdimethyl, dimethylsilanediylbis(cyclopentadienyl)titaniumaimethyl, dimethylsilanediylbis(cyclopentadienyl)zirconiumdimethyl, dimethylsilanediylbis(cyclopentadienyl)hafniumdimethyl, dimethylsilanediylbis(methylcyclopentadienyl)titaniumdimethyl, dimethylsilanediylbis(methylcyclopentadienyl)zirconiumdimethyl, dimethylsilanediylbis(methylcyclopentadienyl)hafniumdimethyl, dimethylsilanediylbis(butylcyclopentadienyl)titaniumdimethyl, dimethylsilanediylbis(butylcyclopentadienyl)zirconiumdimethyl, dimethylsilanediylbis(butylcyclopentadienyl)hafniumdimethyl, dimethylsilanediylbis(2,4,5-trimethylcyclopentadienyl)titaniumdimethyl, dimethylsilanediylbis(2,4-dimethylcyclopentadienyl)titaniumdimethyl, dimethylsilanediylbis(3-methylcyclopentadienyl)titaniumdimethyl, dimethylsilanediylbis(4-t-butyl-2-methylcyclopentadienyl)titaniumdimethyl, dimethylsilanediylbis(tetramethylcyclopentadienyl)titaniumdimethyl, dimethylsilanediylbis(indenyl)titaniumdimethyl, dimethylsilanediylbis(2-methyl-1-indenyl)titaniumdimethyl, dimethylsilanediylbis(tetrahydroindenyl)titaniumdimethyl, dimethylsilanediyl(cyclopentadienyl-9-fluorenyl)titaniumdimethyl, dimethylsilanediyl(cyclopentadienyl-2,7-dimethyl-9-fluorenyl)titaniumdimethyl, dimethylsilanediyl(cyclopentadienyl-2,7-di-t-butyl-9-fluorenyl)titaniumdimethyl, dimethylsilanediylbis(2,4,5-trimethylcyclopentadienyl)zirconiumdimethyl, dimethylsilanediylbis(2,4-dimethylcyclopentadienyl)zirconiumdimethyl, dimethylsilanediylbis(3-methylcyclopentadienyl)zirconiumdimethyl, dimethylsilanediylbis(4-t-butyl-2-methylcyclopentadienyl)zirconiumdimethyl, dimethylsilanediylbis(tetramethylcyclopentadienyl)zirconiumdimethyl, dimethylsilanediylbis(indenyl)zirconiumdimethyl, dimethylsilanediylbis(2-methyl-1-indenyl)zirconiumdimethyl, dimethylsilanediylbis(tetrahydroindenyl)zirconiumdimethyl, dimethylsilanediyl(cyclopentadienyl-9-fluorenyl)zirconiumdimethyl, dimethylsilanediyl(cyclopentadienyl-2,7-dimethyl-9-fluorenyl)zirconiumdimethyl, dimethylsilanediyl(cyclopentadienyl-2,7-di-t-butyl-9-fluorenyl)zirconiumdimethyl, dimethylsilanediylbis(2,4,5-trimethylcyclopentadienyl)hafniumdimethyl, dimethylsilanediylbis(2,4-dimethylcyclopentadienyl)hafniumdimethyl, dimethylsilanediylbis(3-methylcyclopentadienyl)hafniumdimethyl, dimethylsilanediylbis(4-t-butyl-2-methylcyclopentadienyl)hafniumdimethyl, dimethylsilanediylbis(tetramethylcyclopentadienyl)hafniumdimethyl, dimethylsilanediylbis(indenyl)hafniumdimethyl, dimethylsilanediylbis(2-methyl-1-indenyl)hafniumdimethyl, dimethylsilanediylbis(tetrahydroindenyl) hafniumdimethyl, dimethylsilanediyl(cyclopentadienyl-9-fluorenyl)hafniumdimethyl, dimethylsilanediyl(cyclopentadienyl-2,7-dimethyl-9-fluorenyl)hafniumdimethyl, dimethylsilanediyl(cyclopentadienyl-2,7-di-t-butyl-9-fluorenyl)hafniumdimethyl, diethylsilanediylbis(2,4,5-trimethylcyclopentadienyl)titaniumdimethyl, diethylsilanediylbis(2,4-dimethylcyclopentadienyl)titaniumdimethyl, diethylsilanediylbis(3-methylcyclopentadienyl)titaniumdimethyl, diethylsilanediylbis(4-t-butyl-2-methylcyclopentadienyl)titaniumdimethyl, diethylsilanediylbis(tetramethylcyclopentadienyl)titaniumdimethyl, diethylsilanediylbis(indenyl)titaniumdimethyl, diethylsilanediylbis(2-methyl-1-indenyl)titaniumdimethyl, diethylsilanediylbis(tetrahydroindenyl)titaniumdimethyl, diethylsilanediyl(cyclopentadienyl-9-fluorenyl)titaniumdimethyl, diethylsilanediyl(cyclopentadienyl-2,7-dimethyl-9-fluorenyl)titaniumdimethyl, diethylsilanediylbis(cyclopentadienyl-2,7-di-t-butyl-9-fluorenyl)titaniumdimethyl, diethylsilanediylbis(2,4,5-trimethylcyclopentadienyl)zirconiumdimethyl, diethylsilanediylbis(2,4-dimethylcyclopentadienyl)zirconiumdimethyl, diethylsilanediylbis(3-methylcyclopentadienyl)zirconiumdimethyl, diethylsilanediylbis(4-t-butyl-2-methylcyclopentadienyl)zirconiumdimethyl, diethylsilanediylbis(tetramethylcyclopentadienyl)zirconiumdimethyl, diethylsilanediylbis(indenyl)zirconiumdimethyl, diethylsilanediylbis(2-methyl-1-indenyl)zirconiumdimethyl, diethylsilanediylbis(tetrahydroindenyl)zirconiumdimethyl, diethylsilanediyl(cyclopentadienyl-9-fluorenyl)zirconiumdimethyl, diethylsilanediyl(cyclopentadienyl-2,7-dimethyl-9-fluorenyl)zirconiumdimethyl, diethylsilanediyl(cyclopentadienyl-2,7-di-t-butyl-9-fluorenyl)zirconiumdimethyl, diethylsilanediylbis(2,4,5-trimethylcyclopentadienyl)hafniumdimethyl, diethylsilanediylbis(3-methylcyclopentadienyl)hafniumdimethyl, diethylsilanediylbis(4-t-butyl-2-methylcyclopentadienyl)hafniumdimethyl, diethylsilanediylbis(tetramethylcyclopentadienyl)hafniumdimethyl, diethylsilanediylbis(indenyl)hafniumdimethyl, diethylsilanediylbis(2-methyl-1-indenyl)hafniumdimethyl, diethylsilanediylbis( tetrahydroindenyl)hafniumdimethyl, diethylsilanediyl (cyclopentadienyl-9-fluorenyl)hafniumdimethyl, diethylsilanediyl(cyclopentadienyl-2,7-dimethyl-9-fluorenyl)hafniumdimethyl, diethylsilanediyl (cyclopentadienyl-2,7-di -t-butyl-9-fluorenyl)hafniumdimethyl, diphenylsilanediylbis(2,4,5-trimethylcyclopentadienyl)titaniumdimethyl, diphenylsilanediylbis( 2,4-dimethylcyclopentadienyl)titaniumdimethyl, diphenylsilanediylbis(3-methylcyclopentadienyl)titaniumdimethyl, diphenylsilanediylbis(4-t-butyl-2-methylcyclopentadienyl)titaniumdimethyl, diphenylsilanediylbis(tetramethylcyclopentadienyl)titaniumdimethyl, diphenylsilanediylbis(indenyl)titaniumdimethyl, diphenylsilanediylbis(2-methyl-1-indenyl)titaniumdimethyl, diphenylsilanediylbis(tetrahydroindenyl)titaniumdimethyl, diphenylsilanediyl(cyclopentadienyl-9-fluorenyl)titaniumdimethyl, diphenylsilanediyl(cyclopentadienyl-2,7-dimethyl-9-fluorenyl)titaniumdimethyl, diphenylsilanediyl(cyclopentadienyl-2,7-di-t-butyl-9-fluorenyl)titaniumdimethyl, diphenylsilanediylbis(2,4,5-trimethylcyclopentadienyl)zirconiumdimethyl, diphenylsilanediylbis(2,4-dimethylcyclopentadienyl)zirconiumdimethyl, diphenylsilanediylbis(3-methylcyclopentadienyl) zirconiumdimethyl, diphenylsilanediylbis(4-t-butyl-2-methylcyclopentadienyl)zirconiumdimethyl, diphenylsilanediylbis(tetramethylcyclopentadienyl) zirconiumdimethyl, diphenylsilanediylbis(indenyl) zirconiumdimethyl, diphenylsilanediylbis(2-methyl-1-indenyl)zirconiumdimethyl, diphenylsilanediylbis (tetrahydroindenyl)zirconiumdimethyl, diphenylsilanediyl (cyclopentadienyl-9-fluorenyl)zirconiumdimethyl, diphenylsilanediyl(cyclopentadienyl-2,7-dimethyl-9-fluorenyl)zirconiumdimethyl, diphenylsilanediyl (cyclopentadienyl-2,7-di-t-butyl-9-fluorenyl) zirconiumdimethyl, diphenylsilanediylbis(2,4,5-trimethylcyclopentadienyl)hafniumdimethyl, diphenylsilanediylbis(3-methylcyclopentadienyl) hafniumdimethyl, diphenylsilanediylbis(4-t-butyl-2-methylcyclopentadienyl)hafniumdimethyl, diphenylsilanediylbis(tetramethylcyclopentadienyl)hafnium dimethyl, diphenylsilanediylbis(indenyl)hafniumdimethyl, diphenylsilanediylbis(2-methyl-1-indenyl) hafniumdimethyl, diphenylsilanediylbis(tetrahydroindenyl) hafniumdimethyl, diphenylsilanediyl (cyclopentadienyl-9-fluorenyl )hafniumdimethyl, diphenylsilanediyl (cyclopentadienyl-2,7-dimethyl-9-fluorenyl) hafniumdimethyl, diphenylsilanediyl(cyclopentadienyl-2,7-di -t-butyl-9-fluorenyl)hafniumdimethyl, pentamethylcyclopentadienyl-di-t-butylphosphinotitaniumdimethyl, pentamethylcyclopentadienyl-di-t-butylamidotitaniumdimethyl, pentamethylcyclopentadienyl-n-butoxide titaniumdimethyl, pentamethylcyclopentadienyl-di-t-butylphosphinozirconiumdimethyl, pentamethylcyclopentadienyl-di-t-butylamidozirconiumdimethyl, pentamethylcyclopentadienyl-n-butoxide zirconiumdimethyl, pentamethylcyclopentadienyl-di-t-butylphosphinohafniumdimethyl, pentamethylcyclopentadienyl-di-t-butylamidohafniumdimethyl, pentamethylcyclopentadienyl-n-butoxide hafniumdimethyl, dimethylsilanediyl tetramethylcyclopentadienyl-t-butylamidotitaniumdimethyl, dimethylsilanediyl-t-butyl-cyclopentadienyl-t-butylamidotitaniumdimethyl, dimethylsilanediyl trimethylsilylcyclopentadienyl-t-butylamidotitaniumdimethyl, dimethylsilanediyl tetramethylcyclopentadienylphenylamidotitaniumdimethyl, methylphenylsilanediyl tetramethylcyclopentadienyl-t-butylamidotitaniumdimethyl, dimethylsilanediyl tetramethylcyclopentadienyl-p-n-butylphenylamidotitaniumdimethyl, dimethylsilanediyl tetramethylcyclopentadienyl-p-methoxyphenylamidotitaniumdimethyl, dimethylsilanediyl-t-butylcyclopentadienyl-2,5-di-t-butyl-phenylamidotitaniumdimethyl, dimethylsilanediylindenyl-t-butylamidotitaniumdimethyl, dimethylsilanediyl tetramethylcyclopentadienyl cyclohexylamidotitaniumdimethyl, dimethylsilanediylfluorenyl cyclohexylamidotitaniumdimethyl, dimethylsilanediyl tetramethylcyclopentadienyl cyclododecylamidotitaniumdimethyl, dimethylsilanediyl tetramethylcyclopentadienyl-t-butylamidozirconiumdimethyl, dimethylsilanediyl-t-butyl-cyclopentadienyl-t-butylamidozirconiumdimethyl, dimethylsilyltrimethylsilanediyl cyclopentadienyl-t-butylamidozirconiumdimethyl, dimethylsilanediyl tetramethylcyclopentadienylphenylamidozirconiumdimethyl, methylphenylsilanediyl tetramethylcyclopentadienyl-t-butylamidozirconiumdimethyl, dimethylsilanediyl tetramethylcyclopentadienyl-p-n-butylphenylamidozirconiumdimethyl, dimethylsilanediyl tetramethylcyclopentadienyl-p-methoxyphenylamidozirconiumdimethyl, dimethylsilanediyl-t-butylcyclopentadienyl-2,5-di-t-butyl-phenylamidozirconiumdimethyl, dimethylsilanediylindenyl-t-butylamidozirconiumdimethyl, dimethylsilanediyl tetramethylcyclopentadienyl cyclohexylamidozirconiumdimethyl, dimethylsilanediylfluorenyl cyclohexylamidozirconiumdimethyl, dimethylsilanediyl tetramethylcyclopentadienyl cyclododecylamidozirconiumdimethyl, dimethylsilanediyl tetramethylcyclopentadienyl-t-butylamidohafniumdimethyl, dimethylsilanediyl-t-butyl-cyclopentadienyl-t-butylamidohafniumdimethyl, dimethylsilanediyl trimethylsilylcyclopentadienyl-t-butylamidohafniumdimethyl, dimethylsilanediyl tetramethylcyclopentadienylphenylamidohafniumdimethyl, methylphenylsilanediyl tetramethylcyclopentadienyl-t-butylamidohafniumdimethyl, dimethylsilanediyl tetramethylcyclopentadienyl-p-n-butylphenylamidohafniumdimethyl, dimethylsilanediyl tetramethylcyclopentadienyl-p-methoxyphenylamidohafniumdimethyl, dimethylsilanediyl-t-butylcyclopentadienyl-2,5-di-t-butyl-phenylamidohafniumdimethyl, dimethylsilanediylindenyl-t-butylamidohafniumdimethyl, dimethylsilanediyl tetramethylcyclopentadienyl cyclohexylamidohafniumdimethyl, dimethylsilanediylfluorenyl cyclohexylamidohafniumdimethyl, dimethylsilanediyl tetramethylcyclopentadienyl cyclododecylamidohafniumdimethyl, bis(cyclopentadienyl) titaniumdiphenyl, bis(cyclopentadienyl)zirconiumdiphenyl, bis(cyclopentadienyl)hafniumdiphenyl, bis (methylcyclopentadienyl)titaniumdiphenyl, bis (methylcyclopentadienyl)zirconiumdiphenyl, bis (methylcyclopentadienyl)hafniumdiphenyl, bis (butylcyclopentadienyl)titaniumdiphenyl, bis (butylcyclopentadienyl)zirconiumdiphenyl, bis (butylcyclopentadienyl)hafniumdiphenyl, bis (pentamethylcyclopentadienyl)titaniumdiphenyl, bis (pentamethylcyclopentadienyl)zirconiumdiphenyl, bis (pentamethylcyclopentadienyl)hafniumdiphenyl, bis (indenyl)titaniumdiphenyl, bis(indenyl)zirconiumdiphenyl, bis(indenyl)hafniumdiphenyl, methylenebis (cyclopentadienyl)titaniumdiphenyl, methylenebis (cyclopentadienyl)zirconiumdiphenyl, methylenebis (cyclopentadienyl)hafniumdiphenyl, methylenebis (methylcyclopentadienyl)titaniumdiphenyl, methylenebis (methylcyclopentadienyl)zirconiumdiphenyl, methylenebis (methylcyclopentadienyl)hafniumdiphenyl, methylenebis (butylcyclopentadienyl)titaniumdiphenyl, methylenebis (butylcyclopentadienyl)zirconiumdiphenyl, methylenebis (butylcyclopentadienyl)hafniumdiphenyl, methylenebis (tetramethylcyclopentadienyl)titaniumdiphenyl, methylenebis(tetramethylcyclopentadienyl) zirconiumdiphenyl, methylenebis (tetramethylcyclopentadienyl) hafniumdiphenyl, ethylenebis(indenyl)titaniumdiphenyl, ethylenebis(indenyl) zirconiumdiphenyl, ethylenebis(indenyl)hafniumdiphenyl, ethylenebis(tetrahydroindenyl)titaniumdiphenyl, ethylenebis(tetrahydroindenyl)zirconiumdiphenyl, ethylenebis(tetrahydroindenyl)hafniumdiphenyl, ethylenebis(2-methyl-1-indenyl)titaniumdiphenyl, ethylenebis(2-methyl-1-indenyl)zirconiumdiphenyl, ethylenebis(2-methyl-1-indenyl)hafniumdiphenyl, isopropylidene(cyclopentadienyl-9-fluorenyl) titaniumdiphenyl, isopropylidene(cyclopentadienyl-9-fluorenyl)zirconiumdiphenyl, isopropylidene (cyclopentadienyl-9-fluorenyl)hafniumdiphenyl, isopropylidene(cyclopentadienyl-2,7-dimethyl-9-fluorenyl) titaniumdiphenyl, isopropylidene(cyclopentadienyl-2,7-dimethyl-9-fluorenyl)zirconiumdiphenyl, isopropylidene (cyclopentadienyl-2,7-dimethyl-9-fluorenyl) hafniumdiphenyl, isopropylidene(cyclopentadienyl-2,7-di-t-butyl-9-fluorenyl)titaniumdiphenyl, isopropylidene (cyclopentadienyl-2,7-di-t-butyl-9-fluorenyl) zirconiumdiphenyl, isopropylidene(cyclopentadienyl-2,7-di-t-butyl-9-fluorenyl)hafniumdiphenyl, diphenylmethylene (cyclopentadienyl-9-fluorenyl)titaniumdiphenyl, diphenylmethylene(cyclopentadienyl-9-fluorenyl) zirconiumdiphenyl, diphenylmethylene(cyclopentadienyl-9-fluorenyl)hafniumdiphenyl, diphenylmethylene (cyclopentadienyl-2,7-dimethyl-9-fluorenyl) titaniumdiphenyl, diphenylmethylene(cyclopentadienyl-2, 7-dimethyl-9-fluorenyl)zirconiumdiphenyl, diphenylmethylene(cyclopentadienyl-2,7-dimethyl-9-fluorenyl)hafniumdiphenyl, diphenylmethylene (cyclopentadienyl-2,7-di-t-butyl-9-fluorenyl) titaniumdiphenyl, diphenylmethylene(cyclopentadienyl-2, 7-di-t-butyl-9-fluorenyl)zirconiumdiphenyl, diphenylmethylene(cyclopentadienyl-2,7-di-t-butyl-9-fluorenyl)hafniumdiphenyl, dimethylsilanediylbis (cyclopentadienyl)titaniumdiphenyl, dimethylsilanediylbis (cyclopentadienyl)zirconiumdiphenyl, dimethylsilanediylbis(cyclopentadienyl)hafniumdiphenyl, dimethylsilanediylbis(methylcyclopentadienyl) titaniumdiphenyl, dimethylsilanediylbis (methylcyclopentadienyl)zirconiumdiphenyl, dimethylsilanediylbis(methylcyclopentadienyl) hafniumdiphenyl, dimethylsilanediylbis (butylcyclopentadienyl)titaniumdiphenyl, dimethylsilanediylbis(butylcyclopentadienyl) zirconiumdiphenyl, dimethylsilanediylbis (butylcyclopentadienyl)hafniumdiphenyl, dimethylsilanediylbis( 2,4,5-trimethylcyclopentadienyl) titaniumdiphenyl, dimethylsilanediylbis(2,4-dimethylcyclopentadienyl)titaniumdiphenyl, dimethylsilanediylbis(3-methylcyclopentadienyl) titaniumdiphenyl, dimethylsilanediylbis(4-t-butyl-2-methylcyclopentadienyl)titaniumdiphenyl, dimethylsilanediylbis(tetramethylcyclopentadienyl) titaniumdiphenyl, dimethylsilanediylbis(indenyl) titaniumdiphenyl, dimethylsilanediylbis(2-methyl-1-indenyl)titaniumdiphenyl, dimethylsilanediylbis (tetrahydroindenyl)titaniumdiphenyl, dimethylsilanediyl (cyclopentadienyl-9-fluorenyl)titaniumdiphenyl, dimethylsilanediyl(cyclopentadienyl-2,7-dimethyl-9-fluorenyl)titaniumdiphenyl, dimethylsilanediyl (cyclopentadienyl-2,7-di-t-butyl-9-fluorenyl) titaniumdiphenyl, dimethylsilanediylbis(2,4,5-trimethylcyclopentadienyl)zirconiumdiphenyl, dimethylsilanediylbis(2,4-dimethylcyclopentadienyl) zirconiumdiphenyl, dimethylsilanediylbis(3-methylcyclopentadienyl)zirconiumdiphenyl, dimethylsilanediylbis(4-t-butyl-2-methylcyclopentadienyl) zirconiumdiphenyl, dimethylsilanediylbis (tetramethylcyclopentadienyl)zirconiumdiphenyl, dimethylsilanediylbis(indenyl)zirconiumdiphenyl, dimethylsilanediylbis(2-methyl-1-indenyl) zirconiumdiphenyl, dimethylsilanediylbis (tetrahydroindenyl)zirconiumdiphenyl, dimethylsilanediyl (cyclopentadienyl-9-fluorenyl)zirconiumdiphenyl, dimethylsilanediyl(cyclopentadienyl-2,7-dimethyl-9-fluorenyl)zirconiumdiphenyl, dimethylsilanediyl (cyclopentadienyl-2,7-di-t-butyl-9-fluorenyl) zirconiumdiphenyl, dimethylsilanediylbis(2,4,5-trimethylcyclopentadienyl)hafniumdiphenyl, dimethylsilanediylbis(2,4-dimethylcyclopentadienyl) hafniumdiphenyl, dimethylsilanediylbis(3-methylcyclopentadienyl)hafniumdiphenyl, dimethylsilanediylbis(4-t-butyl-2-methylcyclopentadienyl) hafniumdiphenyl, dimethylsilanediylbis (tetramethylcyclopentadienyl)hafniumdiphenyl, dimethylsilanediylbis(indenyl)hafniumdiphenyl, dimethylsilanediylbis(2-methyl-1-indenyl) hafniumdiphenyl, dimethylsilanediylbis(tetrahydroindenyl) hafniumdiphenyl, dimethylsilanediyl(cyclopentadienyl-9-fluorenyl)hafniumdiphenyl, dimethylsilanediyl (cyclopentadienyl-2,7-dimethyl-9-fluorenyl) hafniumdiphenyl, dimethylsilanediyl(cyclopentadienyl-2,7-di-t-butyl-9-fluorenyl)hafniumdiphenyl, diethylsilanediylbis (2,4,5-trimethylcyclopentadienyl)titaniumdiphenyl, diethylsilanediylbis(2,4-dimethylcyclopentadienyl) titaniumdiphenyl, diethylsilanediylbis(3-methylcyclopentadienyl)titaniumdiphenyl, diethylsilanediylbis(4-t-butyl-2-methylcyclopentadienyl) titaniumdiphenyl, diethylsilanediylbis (tetramethylcyclopentadienyl)titaniumdiphenyl, diethylsilanediylbis (indenyl)titaniumdiphenyl diethylsilanediylbis (2-methyl-1-indenyl)titaniumdiphenyl, diethylsilanediylbis( tetrahydroindenyl)titaniumdiphenyl, diethylsilanediyl (cyclopentadienyl-9-fluorenyl)titaniumdiphenyl, diethylsilanediyl(cyclopentadienyl-2,7-dimethyl-9-fluorenyl)titaniumdiphenyl, diethylsilanediyl (cyclopentadienyl-2,7-di -t-butyl-9-fluorenyl) titaniumdiphenyl, diethylsilanediylbis(2,4,5-trimethylcyclopentadienyl) zirconiumdiphenyl, diethylsilanediylbis(2,4-dimethylcyclopentadienyl) zirconiumdiphenyl, diethylsilanediylbis(3-methylcyclopentadienyl)zirconiumdiphenyl, diethylsilanediylbis(4-t-butyl-2-methylcyclopentadienyl) zirconiumdiphenyl, diethylsilanediylbis (tetramethylcyclopentadienyl)zirconiumdiphenyl, diethylsilanediylbis(indenyl)zirconiumdiphenyl, diethylsilanediylbis(2-methyl-1-indenyl) zirconiumdiphenyl, diethylsilanediylbis(tetrahydroindenyl) zirconiumdiphenyl, diethylsilanediyl(cyclopentadienyl-9-fluorenyl)zirconiumdiphenyl, diethylsilanediyl (cyclopentadienyl-2,7-dimethyl-9-fluorenyl) zirconiumdiphenyl, diethylsilanediyl(cyclopentadienyl-2,7-di-t-butyl-9-fluorenyl)zirconiumdiphenyl, diethylsilanediylbis(2,4,5-trimethylcyclopentadienyl) hafniumdiphenyl, diethylsilanediylbis(3-methylcyclopentadienyl)hafniumdiphenyl, diethylsilanediylbis(4-t-butyl-2-methylcyclopentadienyl) hafniumdiphenyl, diethylsilanediylbis (tetramethylcyclopentadienyl)hafniumdiphenyl, diethylsilanediylbis(indenyl)hafniumdiphenyl, diethylsilanediylbis(2-methyl-1-indenyl)hafniumdiphenyl, diethylsilanediylbis(tetrahydroindenyl)hafniumdiphenyl, diethylsilanediyl(cyclopentadienyl-9-fluorenyl) hafniumdiphenyl, diethylsilanediyl(cyclopentadienyl-2,7-dimethyl-9-fluorenyl)hafniumdiphenyl, diethylsilanediyl (cyclopentadienyl-2,7-di-t-butyl- 9-fluorenyl) hafniumdiphenyl, diphenylsilanediylbis(2,4,5-trimethylcyclopentadienyl)titaniumdiphenyl, diphenylsilanediylbis(2,4-dimethylcyclopentadienyl) titaniumdiphenyl, diphenylsilanediylbis(3-methylcyclopentadienyl)titaniumdiphenyl, diphenylsilanediylbis(4-t-butyl-2-methylcyclopentadienyl) titaniumdiphenyl, diphenylsilanediylbis(tetramethylcyclopentadienyl)titaniumdiphenyl, diphenylsilanediylbis(indenyl)titaniumdiphenyl, diphenylsilanediylbis(2-methyl-1-indenyl)titaniumdiphenyl, diphenylsilanediylbis(tetrahydroindenyl)titaniumdiphenyl, diphenylsilanediyl(cyclopentadienyl-9-fluorenyl)titaniumdiphenyl, diphenylsilanediyl(cyclopentadienyl-2,7-dimethyl-9-fluorenyl)titaniumdiphenyl, diphenylsilanediyl(cyclopentadienyl-2,7-di-t-butyl-9-fluorenyl)titaniumdiphenyl, diphenylsilanediylbis(2,4,5-trimethylcyclopentadienyl)zirconiumdiphenyl, diphenylsilanediylbis(2,4-dimethylcyclopentadienyl)zirconiumdiphenyl, diphenylsilanediylbis(3-methylcyclopentadienyl)zirconiumdiphenyl, diphenylsilanediylbis(4-t-butyl-2-methylcyclopentadienyl)zirconiumdiphenyl, diphenylsilanediylbis(tetramethylcyclopentadienyl)zirconiumdiphenyl, diphenylsilanediylbis(indenyl)zirconiumdiphenyl, diphenylsilanediylbis(2-methyl-1-indenyl)zirconiumdiphenyl, diphenylsilanediylbis(tetrahydroindenyl)zirconiumdiphenyl, diphenylsilanediyl(cyclopentadienyl-9-fluorenyl)zirconiumdiphenyl, diphenylsilanediyl(cyclopentadienyl-2,7-dimethyl-9-fluorenyl)zirconiumdiphenyl, diphenylsilanediyl(cyclopentadienyl-2,7-di-t-butyl-9-fluorenyl)zirconiumdiphenyl, diphenylsilanediylbis(2,4,5-trimethylcyclopentadienyl)hafniumdiphenyl, diphenylsilanediylbis(3-methylcyclopentadienyl)hafniumdiphenyl, diphenylsilanediylbis(4-t-butyl-2-methylcyclopentadienyl)hafniumdiphenyl, diphenylsilanediylbis(tetramethylcyclopentadienyl)hafniumdiphenyl, diphenylsilanediylbis(indenyl)hafniumdiphenyl, diphenylsilanediylbis(2-methyl-1-indenyl)hafniumdiphenyl, diphenylsilanediylbis(tetrahydroindenyl)hafniumdiphenyl, diphenylsilanediyl(cyclopentadienyl-9-fluorenyl)hafniumdiphenyl, diphenylsilanediyl(cyclopentadienyl-2,7-dimethyl-9-fluorenyl)hafniumdiphenyl, diphenylsilanediyl(cyclopentadienyl-2,7-di-t-butyl-9-fluorenyl)hafniumdiphenyl, pentamethylcyclopentadienyl-di-t-butylphosphinotitaniumdiphenyl, pentamethylcyclopentadienyl-di-t-butylamidotitaniumdiphenyl, pentamethylcyclopentadienyl-n-butoxidotitaniumdiphenyl, pentamethylcyclopentadienyl-di-t-butylphosphinozirconiumdiphenyl, pentamethylcyclopentadienyl-di-t-butylamidozirconiumdiphenyl, pentamethylcyclopentadienyl-n-butoxidozirconiumdiphenyl, pentamethylcyclopentadienyl-di-t-butylphosphinohafniumdiphenyl, pentamethylcyclopentadienyl-di-t-butylamidohafniumdiphenyl, pentamethylcyclopentadienyl-n-butoxidohafniumdiphenyl, dimethylsilanediyltetramethylcyclopentadienyl-t-butylamidotitaniumdiphenyl, dimethylsilanediyl-t-butylcyclopentadienyl-t-butylamidotitaniumdiphenyl, dimethylsilanediyltrimethylsilylcyclopentadienyl-t-butylamidotitaniumdiphenyl, dimethylsilanediyltetramethylcyclopentadienylphenylamidotitaniumdiphenyl, methylphenylsilanediyltetramethylcyclopentadienyl-t-butylamidotitaniumdiphenyl, dimethylsilanediyltetramethylcyclopentadienyl-p-n-butylphenylamidotitaniumdiphenyl, dimethylsilanediyltetramethylcyclopentadienyl-p-methoxyphenylamidotitaniumdiphenyl, dimethylsilanediyl-t-butylcyclopentadienyl-2,5-di-t-butylphenylamidotitaniumdiphenyl, dimethylsilanediylindenyl-t-butylamidotitaniumdiphenyl, dimethylsilanediyltetramethylcyclopentadienylcyclohexylamidotitaniumdiphenyl, dimethylsilanediyl-fluorenylcyclohexylamidotitaniumdiphenyl, dimethylsilanediyltetramethylcyclopentadienylcyclododecylamidotitaniumdiphenyl, dimethylsilanediyltetramethylcyclopentadienyl-t-butylamidozirconiumdiphenyl, dimethylsilanediyl-t-butyl-cyclopentadienyl-t-butylamidozirconiumdiphenyl, dimethylsilyltrimethylsilanediylcyclopentadienyl-t-butylamidozirconiumdiphenyl, dimethylsilanediyltetramethylcyclopentadienylphenylamidozirconiumdiphenyl, methylphenylsilanediyltetramethylcyclopentadienyl-t-butylamidozirconiumdiphenyl, dimethylsilanediyltetramethylcyclopentadienyl-p-n-butylphenylamidozirconiumdiphenyl, dimethylsilanediyltetramethylcyclopentadienyl-p-methoxyphenylamidozirconiumdiphenyl, dimethylsilanediyl-t-butylcyclopentadienyl-2,5-di-t-butylphenylamidozirconiumdiphenyl, dimethylsilanediylindenyl-t-butylamidozirconiumdiphenyl, dimethylsilanediyltetramethylcyclopentadienylcyclohexylamidozirconiumdiphenyl, dimethylsilanediyl-fluorenylcyclohexylamidozirconiumdiphenyl, dimethylsilanediyltetramethylcyclopentadienylcyclododecylamidozirconiumdiphenyl, dimethylsilanediyltetramethylcyclopentadienyl-t-butylamidohafniumdiphenyl, dimethylsilanediyl-t-butylcyclopentadienyl-t-butylamidohafniumdiphenyl, dimethylsilanediyltrimethylsilylcyclopentadienyl-t-butylamidohafniumdiphenyl, dimethylsilanediyltetramethylcyclopentadienylphenylamidohafniumdiphenyl, methylphenylsilanediyltetramethylcyclopentadienyl-t-butylamidohafniumdiphenyl, dimethylsilanediyltetramethylcyclopentadienyl-p-n-butylphenylamidohafniumdiphenyl, dimethylsilanediyltetramethylcyclopentadienyl-p-methoxyphenylamidohafniumdiphenyl, dimethylsilanediyl-t-butylcyclopentadienyl-2,5-di-t-butylphenylamidohafniumdiphenyl, dimethylsilanediylindenyl-t-butylamidohafniumdiphenyl, dimethylsilanediyltetramethylcyclopentadienylcyclohexylamidohafniumdiphenyl, dimethylsilanediyl-fluorenylcyclohexylamidohafniumdiphenyl, dimethylsilanediyltetramethylcyclopentadienylcyclododecylamidohafniumdiphenyl, bis(cyclopentadienyl)titaniumdibenzyl, bis(cyclopentadienyl)zirconiumdibenzyl, bis(cyclopentadienyl)hafniumdibenzyl, bis(methylcyclopentadienyl)titaniumdibenzyl, bis(methylcyclopentadienyl)zirconiumdibenzyl, bis(methylcyclopentadienyl)hafniumdibenzyl, bis(butylcyclopentadienyl)titaniumdibenzyl, bis(butylcyclopentadienyl)zirconiumdibenzyl, bis(butylcyclopentadienyl)hafniumdibenzyl, bis(pentamethylcyclopentadienyl)titaniumdibenzyl, bis(pentamethylcyclopentadienyl)zirconiumdibenzyl, bis(pentamethylcyclopentadienyl)hafniumdibenzyl, bis(indenyl)titaniumdibenzyl, bis(indenyl)zirconiumdibenzyl, bis(indenyl)hafniumdibenzyl, methylenebis(cyclopentadienyl)titaniumdibenzyl, methylenebis(cyclopentadienyl)zirconiumdibenzyl, methylenebis(cyclopentadienyl)hafniumdibenzyl, methylenebis(methylcyclopentadienyl)titaniumdibenzyl, methylenebis (methylcyclopentadienyl)zirconiumdibenzyl, methylenebis(methylcyclopentadienyl)hafniumdibenzyl, methylenebis(butylcyclopentadienyl)titaniumdibenzyl, methylenebis(butylcyclopentadienyl)zirconiumdibenzyl, methylenebis(butylcyclopentadienyl)hafniumdibenzyl, methylenebis(tetramethylcyclopentadienyl)titaniumdibenzyl, methylenebis(tetramethylcyclopentadienyl)zirconiumdibenzyl, methylenebis(tetramethylcyclopentadienyl)hafniumdibenzyl, ethylenebis(indenyl)titaniumdibenzyl, ethylenebis(indenyl)zirconiumdibenzyl, ethylenebis(indenyl)hafniumdibenzyl, ethylenebis(tetrahydroindenyl)titaniumdibenzyl, ethylenebis(tetrahydroindenyl)zirconiumdibenzyl, ethylenebis(tetrahydroindenyl)hafniumdibenzyl, ethylenebis(2-methyl-1-indenyl)titaniumdibenzyl, ethylenebis(2-methyl-1-indenyl)zirconiumdibenzyl, ethylenebis(2-methyl-1-indenyl)hafniumdibenzyl, isopropylidene(cyclopentadienyl-9-fluorenyl)titaniumdibenzyl, isopropylidene(cyclopentadienyl-9-fluorenyl)zirconiumdibenzyl, isopropylidene(cyclopentadienyl-9-fluorenyl)hafniumdibenzyl, isopropylidene(cyclopentadienyl-2,7-dimethyl-9-fluorenyl)titaniumdibenzyl, isopropylidene(cyclopentadienyl-2,7-dimethyl-9-fluorenyl)zirconiumdibenzyl, isopropylidene(cyclopentadienyl-2,7-dimethyl-9-fluorenyl)hafniumdibenzyl, isopropylidene(cyclopentadienyl-2,7-di-t-butyl-9-fluorenyl)titaniumdibenzyl, isopropylidene(cyclopentadienyl-2,7-di-t-butyl-9-fluorenyl)zirconiumdibenzyl, isopropylidene(cyclopentadienyl-2,7-di-t-butyl-9-fluorenyl)hafniumdibenzyl, diphenylmethylene(cyclopentadienyl-9-fluorenyl)titaniumdibenzyl, diphenylmethylene(cyclopentadienyl-9-fluorenyl)zirconiumdibenzyl, diphenylmethylene(cyclopentadienyl-9-fluorenyl)hafniumdibenzyl, diphenylmethylene(cyclopentadienyl-2,7-dimethyl-9-fluorenyl)titaniumdibenzyl, diphenylmethylene(cyclopentadienyl-2,7-dimethyl-9-fluorenyl)zirconiumdibenzyl, diphenylmethylene(cyclopentadienyl-2,7-dimethyl-9-fluorenyl)hafniumdibenzyl, diphenylmethylene(cyclopentadienyl-2,7-di-t-butyl-9-fluorenyl)titaniumdibenzyl, diphenylmethylene(cyclopentadienyl-2,7-di-t-butyl-9-fluorenyl)zirconiumdibenzyl, diphenylmethylene(cyclopentadienyl-2,7-di-t-butyl-9-fluorenyl)hafniumdibenzyl, dimethylsilanediylbis(cyclopentadienyl)titaniumdibenzyl, dimethylsilanediylbis(cyclopentadienyl)zirconiumdibenzyl, dimethylsilanediylbis(cyclopentadienyl)hafniumdibenzyl, dimethylsilanediylbis(methylcyclopentadienyl)titaniumdibenzyl, dimethylsilanediylbis(methylcyclopentadienyl)zirconiumdibenzyl, dimethylsilanediylbis(methylcyclopentadienyl)hafniumdibenzyl, dimethylsilanediylbis(butylcyclopentadienyl)titaniumdibenzyl, dimethylsilanediylbis(butylcyclopentadienyl)zirconiumdibenzyl, dimethylsilanediylbis(butylcyclopentadienyl)hafniumdibenzyl, dimethylsilanediylbis(2,4,5-trimethylcyclopentadienyl)titaniumdibenzyl, dimethylsilanediylbis(2,4-dimethylcyclopentadienyl)titaniumdibenzyl, dimethylsilanediylbis(3-methylcyclopentadienyl)titaniumdibenzyl, dimethylsilanediylbis(4-t-butyl-2-methylcyclopentadienyl)titaniumdibenzyl, dimethylsilanediylbis(tetramethylcyclopentadienyl)titaniumdibenzyl, dimethylsilanediylbis(indenyl)titaniumdibenzyl, dimethylsilanediylbis(2-methyl-1-indenyl)titaniumdibenzyl, dimethylsilanediylbis(tetrahydroindenyl)titaniumdibenzyl, dimethylsilanediyl(cyclopentadienyl-9-fluorenyl)titaniumdibenzyl, dimethylsilanediyl(cyclopentadienyl-2,7-dimethyl-9-fluorenyl)titaniumdibenzyl, dimethylsilanediyl(cyclopentadienyl-2,7-di-t-butyl-9-fluorenyl)titaniumdibenzyl, dimethylsilanediylbis(2,4,5-trimethylcyclopentadienyl)zirconiumdibenzyl, dimethylsilanediylbis(2,4-dimethylcyclopentadienyl)zirconiumdibenzyl, dimethylsilanediylbis(3-methylcyclopentadienyl)zirconiumdibenzyl, dimethylsilanediylbis(4-t-butyl-2-methylcyclopentadienyl)zirconiumdibenzyl, dimethylsilanediylbis(tetramethylcyclopentadienyl)zirconiumdibenzyl, dimethylsilanediylbis(indenyl)zirconiumdibenzyl, dimethylsilanediylbis(2-methyl-1-indenyl)zirconiumdibenzyl, dimethylsilanediylbis(tetrahydroindenyl)zirconiumdibenzyl, dimethylsilanediyl(cyclopentadienyl-9-fluorenyl)zirconiumdibenzyl, dimethylsilanediyl(cyclopentadienyl-2,7-dimethyl-9-fluorenyl)zirconiumdibenzyl, dimethylsilanediyl(cyclopentadienyl-2,7-di-t-butyl-9-fluorenyl)zirconiumdibenzyl, dimethylsilanediylbis(2,4,5-trimethylcyclopentadienyl)hafniumdibenzyl, dimethylsilanediylbis(2,4-dimethylcyclopentadienyl)hafniumdibenzyl, dimethylsilanediylbis(3-methylcyclopentadienyl)hafniumdibenzyl, dimethylsilanediylbis(4-t-butyl-2-methylcyclopentadienyl)hafniumdibenzyl, dimethylsilanediylbis(tetramethylcyclopentadienyl)hafniumdibenzyl, dimethylsilanediylbis(indenyl)hafniumdibenzyl, dimethylsilanediylbis(2-methyl-1-indenyl)hafniumdibenzyl, dimethylsilanediylbis(tetrahydroindenyl)hafniumdibenzyl, dimethylsilanediyl(cyclopentadienyl-9-fluorenyl)hafniumdibenzyl, dimethylsilanediyl(cyclopentadienyl-2,7-dimethyl-9-fluorenyl)hafniumdibenzyl, dimethylsilanediyl(cyclopentadienyl-2,7-di-t-butyl-9-fluorenyl)hafniumdibenzyl, diethylsilanediylbis(2,4,5-trimethylcyclopentadienyl)titaniumdibenzyl, diethylsilanediylbis(2,4-dimethylcyclopentadienyl)titaniumdibenzyl, diethylsilanediylbis(3-methylcyclopentadienyl)titaniumdibenzyl, diethylsilanediylbis(4-t-butyl-2-methylcyclopentadienyl)titaniumdibenzyl, diethylsilanediylbis(tetramethylcyclopentadienyl)titaniumdibenzyl, diethylsilanediylbis(indenyl)titaniumdibenzyl, diethylsilanediylbis(2-methyl-1-indenyl)titaniumdibenzyl, diethylsilanediylbis(tetrahydroindenyl)titaniumdibenzyl, diethylsilanediyl(cyclopentadienyl-9-fluorenyl)titaniumdibenzyl, diethylsilanediyl(cyclopentadienyl-2,7-dimethyl-9-fluorenyl)titaniumdibenzyl, diethylsilanediyl(cyclopentadienyl-2,7-di-t-butyl-9-fluorenyl)titaniumdibenzyl, diethylsilanediylbis(2,4,5-trimethylcyclopentadienyl)zirconiumdibenzyl, diethylsilanediylbis(2,4-dimethylcyclopentadienyl)zirconiumdibenzyl, diethylsilanediylbis(3-methylcyclopentadienyl)zirconiumdibenzyl, diethylsilanediylbis(4-t-butyl-2-methylcyclopentadienyl)zirconiumdibenzyl, diethylsilanediylbis(tetramethylcyclopentadienyl)zirconiumdibenzyl, diethylsilanediylbis(indenyl)zirconiumdibenzyl, diethylsilanediylbis(2-methyl-1-indenyl)zirconiumdibenzyl, diethylsilanediylbis(tetrahydroindenyl)zirconiumdibenzyl, diethylsilanediyl(cyclopentadienyl-9-fluorenyl)zirconiumdibenzyl, diethylsilanediyl(cyclopentadienyl-2,7-dimethyl-9-fluorenyl)zirconiumdibenzyl, diethylsilanediyl(cyclopentadienyl-2,7-di-t-butyl-9-fluorenyl)zirconiumdibenzyl, diethylsilanediylbis(2,4,5-trimethylcyclopentadienyl hafniumdibenzyl, diethylsilanediylbis(3-methylcyclopentadienyl)hafniumdibenzyl, diethylsilanediylbis(4-t-butyl-2-methylcyclopentadienyl)hafniumdibenzyl, diethylsilanediylbis(tetramethylcyclopentadienyl)hafniumdibenzyl, diethylsilanediylbis(indenyl)hafniumdibenzyl, diethylsilanediylbis(2-methyl-1-indenyl)hafniumdibenzyl, diethylsilanediylbis(tetrahydroindenyl)hafniumdibenzyl, diethylsilanediyl(cyclopentadienyl-9-fluorenyl)hafniumdibenzyl, diethylsilanediyl(cyclopentadienyl-2,7-dimethyl-9-fluorenyl)hafniumdibenzyl, diethylsilanediyl(cyclopentadienyl-2,7-di-t-butyl-9-fluorenyl)hafniumdibenzyl, diphenylsilanediylbis(2,4,5-trimethylcyclopentadienyl)titaniumdibenzyl, diphenylsilanediylbis(2,4-dimethylcyclopentadienyl)titaniumdibenzyl, diphenylsilanediylbis(3-methylcyclopentadienyl)titaniumdibenzyl, diphenylsilanediylbis(4-t-butyl-2-methylcyclopentadienyl)titaniumdibenzyl, diphenylsilanediylbis(tetramethylcyclopentadienyl)titaniumdibenzyl, diphenylsilanediylbis(indenyl)titaniumdibenzyl, diphenylsilanediylbis(2-methyl-1-indenyl)titaniumdibenzyl, diphenylsilanediylbis(tetrahydroindenyl)titaniumdibenzyl, diphenylsilanediyl(cyclopentadienyl-9-fluorenyl)titaniumdibenzyl, diphenylsilanediyl(cyclopentadienyl-2,7-dimethyl-9-fluorenyl)titaniumdibenzyl, diphenylsilanediyl(cyclopentadienyl-2,7-di-t-butyl-9-fluorenyl)titaniumdibenzyl, diphenylsilanediylbis(2,4,5-trimethylcyclopentadienyl)zirconiumdibenzyl, diphenylsilanediylbis(2,4-dimethylcyclopentadienyl)zirconiumdibenzyl, diphenylsilanediylbis(3-methylcyclopentadienyl)zirconiumdibenzyl, diphenylsilanediylbis(4-t-butyl-2-methylcyclopentadienyl)zirconiumdibenzyl, diphenylsilanediylbis(tetramethylcyclopentadienyl)zirconiumdibenzyl, diphenylsilanediylbis(indenyl)zirconiumdibenzyl, diphenylsilanediylbis(2-methyl-1-indenyl)zirconiumdibenzyl, diphenylsilanediylbis(tetrahydroindenyl)zirconiumdibenzyl, diphenylsilanediyl(cyclopentadienyl-9-fluorenyl)zirconiumdibenzyl, diphenylsilanediyl(cyclopentadienyl-2,7-dimethyl-9-fluorenyl)zirconiumdibenzyl, diphenylsilanediyl(cyclopentadienyl-2,7-di-t-butyl-9-fluorenyl)zirconiumdibenzyl, diphenylsilanediylbis(2,4,5-trimethylcyclopentadienyl)hafniumdibenzyl, diphenylsilanediylbis(3-methylcyclopentadienyl)hafniumdibenzyl, diphenylsilanediylbis(4-t-butyl-2-methylcyclopentadienyl)hafniumdibenzyl, diphenylsilanediylbis(tetramethylcyclopentadienyl)hafniumdibenzyl, diphenylsilanediylbis(indenyl)hafniumdibenzyl, diphenylsilanediylbis(2-methyl-1-indenyl)hafniumdibenzyl, diphenylsilanediylbis(tetrahydroindenyl)hafniumdibenzyl, diphenylsilanediyl(cyclopentadienyl-9-fluorenyl)hafniumdibenzyl, diphenylsilanediyl(cyclopentadienyl-2,7-dimethyl-9-fluorenyl)hafniumdibenzyl, diphenylsilanediyl(cyclopentadienyl-2,7-di-t-butyl-9-fluorenyl)hafniumdibenzyl, pentamethylcyclopentadienyl-di-t-butylphosphinotitaniumdibenzyl, pentamethylcyclopentadienyl-di-t-butylamidotitaniumdibenzyl, pentamethylcyclopentadienyl-n-butoxidotitaniumdibenzyl, pentamethylcyclopentadienyl-di-t-butylphosphinozirconiumdibenzyl, pentamethylcyclopentadienyl-di-t-butylamidozirconiumdibenzyl, pentamethylcyclopentadienyl-n-butoxidozirconiumdibenzyl, pentamethylcyclopentadienyl-di-t-butylphosphinohafniumdibenzyl, pentamethylcyclopentadienyl-di-t-butylamidohafniumdibenzyl, pentamethylcyclopentadienyl-n-butoxidohafniumdibenzyl, dimethylsilanediyltetramethylcyclopentadienyl-t-butylamidotitaniumdibenzyl, dimethylsilanediyl-t-butylcyclopentadienyl-t-butylamidotitaniumdibenzyl, dimethylsilanediyltrimethylsilylcyclopentadienyl-t-butylamidotitaniumdibenzyl, dimethylsilanediyltetramethylcyclopentadienylphenylamidotitaniumdibenzyl, methylphenylsilanediyltetramethylcyclopentadienyl-t-butylamidotitaniumdibenzyl, dimethylsilanediyltetramethylcyclopentadienyl-p-n-butylphenylamidotitaniumdibenzyl, dimethylsilanediyltetramethylcyclopentadienyl-p-methoxyphenylamidotitaniumdibenzyl, dimethylsilanediyl-t-butylcyclopentadienyl-2,5-di-t-butylphenylamidotitaniumdibenzyl, dimethylsilanediylindenyl-t-butylamidotitaniumdibenzyl, dimethylsilanediyltetramethylcyclopentadienylcyclohexylamidotitaniumdibenzyl, dimethylsilanediylfluorenylcyclohexylamidotitaniumdibenzyl, dimethylsilanediyltetramethylcyclopentadienylcyclododecylamidotitaniumdibenzyl, dimethylsilanediyltetramethylcyclopentadienyl-t-butylamidozirconiumdibenzyl, dimethylsilanediyl-t-butylcyclopentadienyl-t-butylamidozirconiumdibenzyl, dimethylsilyltrimethylsilanediylcyclopentadienyl-t-butylamidozirconiumdibenzyl, dimethylsilanediyltetramethylcyclopentadienylphenylamidozirconiumdibenzyl, methylphenylsilanediyltetramethylcyclopentadienyl-t-butylamidozirconiumdibenzyl, dimethylsilanediyltetramethylcyclopentadienyl-p-n-butylphenylamidozirconiumdibenzyl, dimethylsilanediyltetramethylcyclopentadienyl-p-methoxyphenylamidozirconiumdibenzyl, dimethylsilanediyl-t-butylcyclopentadienyl- 2,5-di-t-butylphenylamidozirconiumdibenzyl, dimethylsilanediylindenyl-t-butylamidozirconiumdibenzyl, dimethylsilanediyltetramethylcyclopentadienylcyclohexylamidozirconiumdibenzyl, dimethylsilanediylfluorenylcyclohexylamidozirconiumdibenzyl, dimethylsilanediyltetramethylcyclopentadienylcyclododecylamidozirconiumdibenzyl, dimethylsilanediyltetramethylcyclopentadienyl-t-butylamidohafniumdibenzyl, dimethylsilanediyl-t-butylcyclopentadienyl-t-butylamidohafniumdibenzyl, dimethylsilanediyltrimethylsilylcyclopentadienyl-t-butylamidohafniumdibenzyl, dimethylsilanediyltetramethylcyclopentadienylphenylamidohafniumdibenzyl, methylphenylsilanediyltetramethylcyclopentadienyl-t-butylamidohafniumdibenzyl, dimethylsilanediyltetramethylcyclopentadienyl-p-n-butylphenylamidohafniumdibenzyl, dimethylsilanediyltetramethylcyclopentadienyl-p-methoxyamidohafniumdibenzyl, dimethylsilanediyl-t-butylcyclopentadienyl-2,5-di-t-butylphenylamidohafniumdibenzyl, dimethylsilanediylindenyl-t-butylamidohafniumdibenzyl, dimethylsilanediyltetramethylcyclopentadienylcyclohexylamidohafniumdibenzyl, dimethylsilanediylfluorenylcyclohexylamidohafniumdibenzyl, dimethylsilanediyltetramethylcyclopentadienylcyclododecylamidohafniumdibenzyl, and dihydrides of these compounds. However, the compound is not limited to such specific examples.

The modified clay (b) to be used in the present invention is a reaction product of the following (b-1) and (b-2).
(b-1) Clay or clay mineral
(b-2) A compound containing an element of Group 15 or 16 of the Periodic Table which is capable of introducing cationic species into an interlaminar structure of clay or clay mineral.

The clay or clay mineral (b-1) is usually an inorganic high molecular compound constituted by tetrahedrons formed by oxygen ions coordinated on silicon ions and octahedrons formed by oxygen or hydroxide ions coordinated on ions of e.g. aluminum, magnesium or iron. The skeletal structures of many clays or clay minerals are not electrically neutral and have positive or negative charges on their surfaces. They have cations in their interlaminar structures to complement such negative charges. Such interlaminar cations can be ion-exchanged by other cations. Therefore, the amount of interlaminar cations is called a cation exchange capacity (CEC) and is represented by milliequivalent (meq) per 100 g of clay. CEC differs depending upon the type of clay, and Clay Handbook, second edition (compiled by Japanese Clay Association, published by Gihodo Shuppan K.K.) gives the following information. Kaolinite; 3 to 15 meq/100 g, halloysite: 5 to 40 meq/100 g, montmorillonite: 80 to 150 meq/100 g, illite: 10 to 40 meq/100 g, vermiculite: 100 to 150 meq/100 g, chlorite: 10 to 40 meq/100 g, zeolite-attapulgite: 20 to 30 meq/100 g. The clay or clay mineral (b-1) to be used in the present invention, is a clay or clay mineral having its surface negatively charged and having a cation exchange ability. Specifically, it may, for example, be a kaolin mineral such as kaolinite, dickite or halloysite; a smectite family such as montmorillonite, hectorite, beidellite, saponite, taeniolite or sauconite; a mica family such as muscovite, paragonite or illite; a vermiculite family; a clintonite family such as margarite or clintonite; a chlorite family such as donbassite, cookeite or clinochlore; or sepiolite-palygorskite. However, the useful clay or clay mineral is not limited to such specific examples. These clay and clay minerals are present in nature. However, it is also possible to artificially synthesize them to obtain products having less impurities. In the present invention, the natural clay and clay minerals as mentioned above, and clay and clay minerals obtainable by artificial syntheses may be used.

The compound (b-2) containing an element of Group 15 or 16 of the Periodic Table which is capable of introducing cation species into the interlaminar structure of the clay or clay mineral, may be an onium compound of the following formula (14) having a proton coordination bonded to a lone electron pair of an element:

$$[R^6{}_n GH]^+[A]^-  \qquad (14)$$

wherein G is an element selected from Groups 15 and 16 of the Periodic Table. Specifically it is an ammonium compound wherein G is a nitrogen atom, a phosphonium compound wherein G is a phosphorus atom, an oxonium compound wherein G is an oxygen atom, or a sulfonium compound wherein G is a sulfur atom. Each of a plurality of $R^6$ which may be the same or different, is a hydrogen atom or a substituent including a $C_{1-20}$ hydrocarbon group. Specifically, the hydrocarbon group may, for example, be a $C_{1-20}$ alkyl group such as methyl, ethyl, propyl, butyl, pentyl, hexyl, heptyl, octyl, nonyl, decyl, dodecyl, isopropyl, isobutyl, s-butyl, t-butyl or cyclohexyl; a $C_{2-20}$ alkenyl group such as vinyl, propenyl or cyclohexenyl; a $C_{6-20}$ aryl group such as phenyl, methylphenyl, ethylphenyl, biphenyl or naphthyl; a $C_{7-20}$ arylalkyl group such as benzyl or phenylethyl. At least one $R^6$ is a $C_{1-20}$ hydrocarbon group, and the plurality of $R^6$ may be bonded to one another. When G is an element of Group 15, n is 3, and when G is an element of Group 16, n=2. $[A]^-$ is a counter anion, which may, for example, be a halogen ion such as a fluorine ion, a chlorine ion, a bromine ion or an iodine ion, or an inorganic anion such as a sulfate ion, but the counter anion is not limited to such specific examples.

Among the above compounds, one wherein G is a nitrogen atom and $[A]^-$ is a chlorine ion, may specifically be, for example, a hydrochloride of an aliphatic primary amine, such as methylamine hydrochloride, ethylamine hydrochloride, propylamine hydrochloride, isopropylamine hydrochloride, butylamine hydrochloride, hexylamine hydrochloride, decylamine hydrochloride, dodecylamine hydrochloride, allylamine hydrochloride, cyclopentylamine hydrochloride or cyclohexylamine hydrochloride; a hydrochloride of an aliphatic secondary amine, such as dimethylamine hydrochloride, diethylamine hydrochloride, diamylamine hydrochloride, didecylamine hydrochloride or diallylamine hydrochloride; a hydrochloride of an aliphatic tertiary amine, such as trimethylamine hydrochloride, tributylamine hydrochloride, triamylamine hydrochloride, triallylamine hydrochloride, N,N-dimethyldecylamine hydrochloride or N,N-dimethylundecylamine hydrochloride; a hydrochloride of an aromatic amine, such as aniline hydrochloride, N-methylaniline hydrochloride, N,N-dimethylaniline hydrochloride, N-ethylaniline hydrochloride, N,N-diethylaniline hydrochloride, N-allylaniline hydrochloride, o-toluidine hydrochloride, m-toluidine hydrochloride, p-toluidine hydrochloride, n-methyl-o-toluidine hydrochloride n-methyl-m-toluidine hydrochloride, n-methyl-p-toluidine hydrochloride, N,N-dimethyl-o-toluidine hydrochloride, N,N-dimethyl-m-toluidine hydrochloride, N,N-dimethyl-p-toluidine hydrochloride, benzylamine hydrochloride, dibenzylamine hydrochloride, tribenzylamine hydrochloride, N-benzyl-N-ethylaniline hydrochloride, diphenylamine hydrochloride, α-naphthylamine hydrochloride, β-naphthylamine hydrochloride, N,N-dimethyl-α-naphthylamine hydrochloride, N,N-dimethyl-β-naphthylamine hydrochloride, o-anisidine hydrochloride, m-anisidine hydrochloride, p-anisidine hydrochloride, N,N,2,6-tetramethylaniline hydrochloride, N,N,3,5-tetramethylaniline hydrochloride, N,N,2,4,6-pentamethylaniline hydrochloride, or 2,3,4,5,6-pentafluoroaniline hydrochloride; or a hydrofluoride, a hydrobromide, a hydroiodide or a sulfate of an amine compound, which corresponds to the above ammonium compound except that $[A]^-$ is a fluorine ion, a bromine ion, an iodine ion or a sulfate ion instead of the chlorine ion. However, the compound is not limited to such specific examples. One wherein G is a phosphorus element and $[A]^-$ is a bromine ion, may specifically be, for example, a phosphonium compound such as triphenylphosphine hydrobromide, tri(o-tolyl)phosphine hydrobromide, tri(p-tolyl)phosphine hydrobromide, or tri(mesityl)phosphine hydrobromide. However, the compound is not limited to such specific examples. One wherein G is an oxygen element and $[A]^-$ is a chlorine ion, may specifically be, for example, an oxonium compound such as a hydrochloride of methyl ether, a hydrochloride of ethyl ether or a hydrochloride of phenyl ether. However, the compound is not limited to such specific examples. Further, a sulfonium compound wherein G is a sulfur element, may, for example, be mentioned.

The onium compound (b-2) to be reacted with clay or clay mineral (b-1) may be one preliminarily isolated. Otherwise, it may be one prepared by contacting a protonic acid such as hydrofluoric acid, hydrochloric acid, hydrobromic acid, hydroiodic acid or sulfuric acid with a corresponding compound such as an amine compound, a phosphine compound, an ether compound or a sulfide compound in the solvent to be used for the reaction with clay or clay mineral (b-1), which may be used as it is.

The catalyst for polymerization of an olefin of the present invention comprises, as a constituting component, a modified clay (b) obtained by modifying the above-mentioned clay or clay mineral (b-1) with a compound (b-2) containing an element of Group 15 or 16 of the Periodic Table which is capable of introducing cation species into the interlaminar structure of the clay or clay mineral. Here, there is no particular restriction as to the conditions for the reaction of the clay or clay mineral (b-1) with the compound (b-2). Further, there is no particular limitation with respect to the reaction ratio of (b-1) and (b-2). However, it is preferred that the compound (b-2) is reacted in an amount of at least equivalent to cations present in the clay or clay mineral (b-1). The above-mentioned clay or clay mineral (b-1) may be composed of one type alone, or may be composed of a plurality of different types to be used as a mixture. Likewise, the compound (b-2) containing an element of Group 15 or 16 of the Periodic Table capable of introducing cation species into the interlayer structure of the clay or clay mineral, may be composed of one type alone or may be composed of a plurality of different types to be used as a mixture. The solvent for the reaction to be used here, may, for example, be water or a polar organic solvent. Specifically, an alcohol such as methyl alcohol or ethyl alcohol, acetone tetrahydrofuran, N,N-dimethylformamide, dimethylsulfoxide or methylene chloride may, for example, be mentioned. These solvents may be used alone or in combination as a solvent mixture. Among them, water or an alcohol is preferred.

In the present invention, the catalyst for polymerization of an olefin is prepared by contacting the above-described transition metal compound (a) of the formula (1), (2) and/or (3) with the modified clay (b) obtained by treating clay or clay mineral with a compound containing an element of Group 15 or 16 of the Periodic Table. Here, the method of adding the catalyst-constituting components or the order of addition is not particularly limited.

In the catalyst system, the amount of the modified clay (b) relative to the transition metal compound (a) is not particularly limited. However, taking the ash content of the resulting polymer or effective formation of active species into consideration, the molar ratio of the transition metal in the transition metal compound (a) to the amount of exchangeable cations containing the element of Group 15 or 16 in the modified clay (b), is preferably within a range of from 1:0.00001 to 1:10,000, more preferably from 1:0.0001 to 1:1,000.

The contact of the above two components is carried out in an inert gas atmosphere in a solvent inert to the respective components. Specifically, the solvent may be an aliphatic hydrocarbon compound such as butane, pentane, hexane, heptane, octane, nonane, decane, tetradecane, cyclopentane or cyclohexane, or an aromatic hydrocarbon compound such as benzene, toluene or xylene. Other than the above organic solvents, a halogen-containing compound such as chloroform, methylene chloride or chlorobenzene, may also be used.

The temperature for the contact may be within a range of from −50° to 300° C. However, it is preferably from 0° C. to the boiling point of the solvent, whereby preparation of the catalyst will be easy, and no special apparatus will be required.

Polymerization can be carried out by using two or more transition metal compounds (a) of the present invention. Further, polymerization can be carried out also by using two or more modified clays (b).

The catalyst for polymerization of an olefin of the present invention can be used for any usual method for polymerization of an olefin, such as slurry polymerization, gas phase polymerization, high pressure polymerization, solution polymerization or bulk polymerization. When a solvent is employed for the polymerization, any organic solvent may be employed so long as it is commonly used for polymerization. Specifically, benzene, toluene, xylene, butane, pentane, hexane, heptane, cyclohexane or methylene chloride, may, for example, be mentioned. Further, an olefin itself supplied during the polymerization, such as propylene, 1-butene, 1-octene or 1-hexene, may also be used as a solvent.

The olefin to be subjected to polymerization in the present invention, may, for example, an α-olefin such as ethylene, propylene, 1-butene, 1-pentene, 4-methyl-1-pentene, 1-hexene, 1-octene, 1-nonene, 1-decene or styrene, a conjugated or non-conjugated diene such as butadiene, 1,4-hexadiene, 5-ethylidene-2-norbornene, dicyclopentadiene, 4-methyl-1,4-hexadiene or 7-methyl-1,6-octadiene, or a cyclic olefin such as cyclobutene. However, it is not limited to such specific examples. Further, for the polymerization, one of them may be used for homopolymerization, or two or more of them may be used for copolymerization.

For the production of a polyolefin by the method of the present invention, there is no particular restriction as to the polymerization conditions such as the polymerization temperature, the polymerization time, the polymerization pressure and the monomer concentration. However, it is preferred to carry out the polymerization at a polymerization temperature within a range of from −100° to 300° C. for a polymerization time within a range of from 10 seconds to 20 hours under a polymerization pressure within a range of from atmospheric pressure to 3,500 kg/cm$^2$ Further, it is possible to carry out adjustment of the molecular weight by means of e.g. hydrogen during the polymerization. The polymerization can be carried out by any method of batch system, semi-continuous system or continuous system, and it can be carried out in a plurality of steps by changing the polymerization conditions. The polyolefin obtained after completion of the polymerization can be separated and recovered from the polymerization solvent by a conventional method, followed by drying to obtain a polyolefin.

Now, the present invention will be described in further detail with reference to Examples. However, it should be understood that the present invention is by no means restricted to such specific Examples.

The polymerization operation, the reaction and the purification of the solvent were all carried out in an inert gas atmosphere. The solvent, etc., used for the reaction were all preliminarily subjected to purification, drying and oxygen removal by conventional methods. Further, the compounds used for the reaction were those synthesized and identified by conventional methods.

Further, the introduced amount of exchangeable cations containing the element of Group 15 or 16 of the Periodic Table, substituted by the modification reaction, was calculated from the difference in the content of sodium in the clay or clay mineral between before and after the modification reaction.

EXAMPLE 1

Preparation of Modified Clay 111 g of dimethylanilinium hydrochloride ($Me_2PhNHCl$) was added to 10 l of deionized water containing 270 g of montmorillonite (KUNIPIA F, tradename, manufactured by Kunimine Kogyo K.K.). After removing the supernatant, the rest was washed with ethanol and then dried under a reduced pressure of 1 Torr at room temperature to obtain a modified clay. The introduced amount of exchangeable cations of this modified clay was 1.0 mmol/g.

Polymerization

A stainless steel autoclave of 150 ml was flushed with nitrogen, and then 1 ml of a toluene solution of bis(cyclopentadienyl)zirconiumdimethyl (1 mmol/1 ml) was added to 49 ml of a toluene slurry containing 100 mg of the above modified clay which was dried again before use under vacuum ($5 \times 10^{-5}$ Torr) at room temperature for 6 hours, followed by stirring at room temperature for 30 minutes, to prepare a catalyst. Ethylene was supplied thereto so that the ethylene pressure became 8 kg/cm$^2$, whereby vigorous heat generation took place, and the internal temperature rose from 27° C. to 60° C. Polymerization was carried out in that state for 30 minutes. Then, unreacted ethylene was removed, and the content in the autoclave was put into a large amount of ethanol to obtain 3.63 g of a polymer.

EXAMPLE 2

Preparation of a Catalyst

Under a nitrogen atmosphere, added into a glass container of 50 ml was 9 ml of a toluene slurry containing 105.0 mg of the modified clay prepared in Example 1, which was further dried before use under vacuum ($5 \times 10^{-5}$ Torr) at room temperature for 6 hours. Further, 1 ml of a toluene solution of bis(cyclopentadienyl)zirconiumdimethyl (1 mmol/1 ml) was added thereto, followed by stirring at room temperature for 10 minutes to obtain a catalyst slurry.

Polymerization

A stainless steel autoclave of 2 l was flushed with nitrogen, and then 1.2 l of hexane and 10 ml of the above catalyst slurry were added. While supplying ethylene so that the ethylene pressure became 6 kg/cm$^2$, polymerization was carried out at a polymerization temperature of 80° C. for 1.5 hours. Ethanol was added to terminate the polymerization. Then, unreacted ethylene was removed, and the content in the autoclave was collected by filtration and dried to obtain 32.41 g of a polymer.

EXAMPLE 3

Preparation of a Catalyst

Under a nitrogen atmosphere, added into a glass container of 50 ml was 9 ml of a toluene slurry containing 105.0 mg of the modified clay prepared in Example 1, which was further dried before use under vacuum ($5 \times 10^{-5}$ Torr) at room temperature for 6 hours. Further, 1 ml of a toluene solution of bis(cyclopentadienyl)zirconiumdimethyl (1 mmol/1 ml) was added thereto, followed by stirring at room temperature for 10 minutes to obtain a catalyst slurry.

Polymerization

A stainless steel autoclave of 2 l was flushed with nitrogen, and then 1.2 l of hexane and 10 ml of the above catalyst slurry were added. After introducing 600 ml of propylene, the temperature was raised to 80° C., and while continuously supplying ethylene (while maintaining the partial pressure at 8 kg/cm$^2$), polymerization was carried out for 1.5 hours. Ethanol was added to terminate the polymerization. Then, unreacted ethylene and propylene were removed, and the content in the autoclave was collected by filtration and dried to obtain 77.2 g of a polymer. The propylene content of this polymer was 15 mol %, for which the $^{13}C$-NMR measurement was carried out using o-dichlorobenzene/$d_6$-benzene (75/25 volume ratio) as a solvent, and the propylene content was calculated by the method disclosed in Macromolecules, vol 10, p. 773 (1977).

EXAMPLE 4

Preparation of a Catalyst

Under a nitrogen atmosphere, added into a glass container of 50 ml was 9 ml of a toluene slurry containing 105.0 mg of the modified clay prepared in Example 1, which was further dried before use under vacuum ($5 \times 10^{-5}$ Torr) at room temperature for 6 hours. Further, 1 ml of a toluene solution of bis(cyclopentadienyl)zirconiumdimethyl (1 mmol/1 ml) was added thereto, followed by stirring at room temperature for 10 minutes to obtain a catalyst slurry.

Polymerization

A stainless steel autoclave of 2 l was flushed with nitrogen, and then 1.2 l of hexane and 10 ml of the above catalyst slurry were added. After introducing 100 ml of hexene-1, the temperature was raised to 80° C., and while continuously supplying ethylene (while maintaining the partial pressure at 8 kg/cm$^2$), polymerization was carried out for 1.5 hours. Ethanol was added to terminate the polymerization. Then, unreacted ethylene and 1-hexene were removed, and the content in the autoclave was collected by filtration and dried to obtain 58.1 g of a polymer. The hexene-1 content of this polymer was 2 mol %, for which the $^{13}C$-NMR measurement was carried out using o-dichlorobenzene/$d_6$-benzene (75/25 volume ratio) as a solvent, and the hexene-1 content was calculated by the method disclosed in Macromolecules, vol 15, p. 1402 (1982).

COMPARATIVE EXAMPLE 1

Polymerization

A stainless steel autoclave of 150 ml was flushed with nitrogen, and then 49 ml of a toluene slurry containing 103.2 mg of the modified clay prepared in Example 1, which was further dried before use under vacuum ($5 \times 10^{-5}$ Torr) at room temperature for 6 hours, and 1 ml of a toluene solution of bis(cyclopentadienyl)zirconiumdichloride (1 mmol/1 ml), were added, followed by stirring at room temperature for 30 minutes, to prepare a catalyst. While supplying ethylene thereto so that the ethylene pressure became 8 kg/cm$^2$, polymerization was carried out at 27° C. for 60 minutes. Then, unreacted ethylene was removed, and the content in the autoclave was put into a large amount of ethanol, but no polymer was obtained.

COMPARATIVE EXAMPLE 2

Polymerization

A stainless steel autoclave of 150 ml was flushed with nitrogen, and then 49 ml of toluene and 1 ml of a toluene solution of bis(cyclopentadienyl)zirconiumdimethyl (1 mmol/1 ml), were added. Then, ethylene was supplied so that the ethylene pressure became 8 kg/cm$^2$, but no change in the internal temperature (27° C.) was observed. Polymerization was carried out in that state for 60 minutes. Then, unreacted ethylene was removed, and the content in the autoclave was put into a large amount of ethanol, to obtain 0.34 g of a polymer.

COMPARATIVE EXAMPLE 3

Preparation of MqCl$_2$ Treated Clay 21 g of montmorillonite (KUNIPIA F, tradename, manufactured by Kunimine Kogyo K.K.) pulverized by a jet mill, was added to 100 ml of an aqueous solution containing 20 g of MgCl$_2$.6H$_2$O, followed by stirring at 90° C. for 30 minutes. After removing the supernatant, the solid component was washed with deionized water, and this treatment was repeated again. After drying under reduced pressure, the solid component was dispersed in a 8% hydrochloric acid aqueous solution, followed by stirring at 90° C. for 2 hours. After removing the supernatant, the solid component was washed with deionized water until the washing water became neutral, to obtain MgCl$_2$ treated clay.

Polymerization

A stainless steel autoclave of 150 ml was flushed with nitrogen, and then 49 ml of a toluene slurry containing 105.6 mg of the above MgCl$_2$ treated clay which was dried under vacuum at room temperature for 6 hours, and 1 ml of a toluene solution of bis(cyclopentadienyl)zirconiumdimethyl (1 mmol/1 ml), were added, followed by stirring at room temperature for 30 minutes, to prepare a catalyst. Ethylene was supplied thereto so that the ethylene pressure became 8 kg/cm$^2$, but no change of the internal temperature (27° C.) was observed. Polymerization was carried out in that state for 60 minutes. Then, unreacted ethylene was removed, and the content in the autoclave was put into a large amount of ethanol to obtain 0.33 g of a polymer.

COMPARATIVE EXAMPLE 4

Polymerization

Into a glass container of 50 me, 132 mg of the above MgCl$_2$ treated clay was put and dried under vacuum at 200° C. for 3 hours. By this treatment, the amount of the MgCl$_2$ treated clay decreased to 126 mg. 49 ml of a toluene slurry of this MgCl$_2$ treated clay and 1 ml of a toluene solution of bis(cyclopentadienyl)zirconiumdimethyl (1 mmol/1 ml) were added into a stainless steel autoclave of 150 ml flushed with nitrogen, followed by stirring at room temperature for 30 minutes to prepare a catalyst. Ethylene was supplied thereto so that the ethylene pressure became 8 kg/cm$^2$, whereby the internal temperature rose from 27° C. to 30° C. Polymerization was carried out in that state for 60 minutes. Then, unreacted ethylene was removed, and the content in the autoclave was put into a large amount of ethanol to obtain 0.76 g of a polymer.

As described in the foregoing, according to the present invention, it is possible to obtain an olefin polymer under a high catalytic activity without requiring a large amount of an organic aluminum component which used to be required, whereby an olefin polymer containing little catalyst residue such as an aluminum compound, can be efficiently produced.

What is claimed is:

1. A catalyst for polymerization of an olefin, which comprises (a) a transition metal compound of the following formula (1), (2) and/or (3):

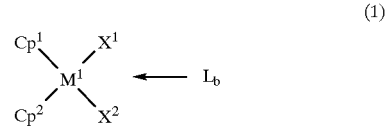

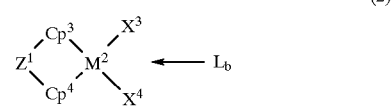

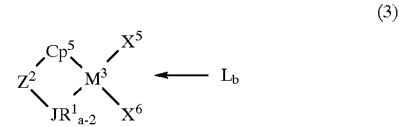

wherein each of $M^1$, $M^2$ and $M^3$ is a titanium atom, a zirconium atom or a hafnium atom, each of $Cp^1$, $Cp^2$, $Cp^3$, $Cp^4$ and $Cp^5$ is a cyclopentadienyl group, an indenyl group, a fluorenyl group or a substitution product thereof, $R^1$ is a hydrogen atom, a $C_{1-20}$ hydrocarbon group or a $C_{1-20}$ alkylsilyl group, each of $X^1$, $X^2$, $X^3$, $X^4$, $X^5$ and $X^6$ is a hydrogen atom or a $C_{1-20}$ hydrocarbon group, $Z^1$ is a $C_{1-20}$ hydrocarbon group, a silicon-containing $C_{1-20}$ hydrocarbon group or a $C_{1-20}$ alkylsilanediyl group, which serves to connect $Cp^3$ and $Cp^4$, $Z^2$ is a $C_{1-20}$ hydrocarbon group, a silicon-containing $C_{1-20}$ hydrocarbon group or a $C_{1-20}$ alkylsilanediyl group, which serves to connect $Cp^5$ and J, J is an element of Group 15 or 16 of the Periodic Table, a is a coordination number of J, L is a Lewis base, and b is the number of the Lewis base L, provided $0 \leq b \leq 3$, and (b) a modified clay obtained by treating clay or clay mineral with a compound containing an element of Group 15 or16 of the Periodic Table.

2. The catalyst for polymerization of an olefin according to claim 1, wherein the compound containing an element of Group 15 or 16 of the Periodic Table is an organic salt having a cation on an element of Group 15 or 16.

3. A method for producing an olefin polymer, which comprises polymerizing or copolymerizing an olefin in the presence of the catalyst for polymerization of an olefin as defined in claim 1.

* * * * *